US010382434B2

(12) United States Patent
Young et al.

(10) Patent No.: US 10,382,434 B2
(45) Date of Patent: *Aug. 13, 2019

(54) ACTIVELY FEDERATED MOBILE AUTHENTICATION

(71) Applicant: Microsoft Technology Licensing, LLC, Redmond, WA (US)

(72) Inventors: Kyle Stapley Young, Duvall, WA (US); Robert Aron Drollinger, Redmond, WA (US); Robert O'Brien, Kirkland, WA (US); David J. Runde, Bellevue, WA (US); Jagruti Dushyant Pandya, Bellevue, WA (US); Georges El Khoury, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,800

(22) Filed: Oct. 5, 2017

(65) Prior Publication Data

US 2018/0219862 A1  Aug. 2, 2018

Related U.S. Application Data

(63) Continuation of application No. 15/047,207, filed on Feb. 18, 2016, now Pat. No. 9,825,948, which is a
(Continued)

(51) Int. Cl.
*H04L 29/06* (2006.01)
*H04L 29/08* (2006.01)

(52) U.S. Cl.
CPC ........ *H04L 63/0869* (2013.01); *H04L 63/061* (2013.01); *H04L 63/08* (2013.01);
(Continued)

(58) Field of Classification Search
CPC ... H04L 63/0869; H04L 63/061; H04L 63/08; H04L 63/0815; H04L 63/0884; H04L 67/02; H04L 67/28; H04L 2463/082
See application file for complete search history.

(56) References Cited

U.S. PATENT DOCUMENTS 7,269,732 B2 * 9/2007 Kilian-Kehr ............ G06F 21/35
709/225
7,657,639 B2 * 2/2010 Hinton ................ H04L 63/0815
709/227
(Continued)

FOREIGN PATENT DOCUMENTS

CN 101110824 A 1/2008
CN 101127757 A 2/2008
(Continued)

OTHER PUBLICATIONS

"[MS-SPBEPO]: SharePoint Back-End Protocols Overview", Retrieved from http://download.microsoft.com/download/3/4/C/34C47498-E69F-4CEF-9B58-5CEB77E1553D/[MS-SPBEPO].pdf, Jul. 16, 2012, 79 Pages.
(Continued)

*Primary Examiner* — Joseph P Hirl
*Assistant Examiner* — J. Brant Murphy
(74) *Attorney, Agent, or Firm* — Christopher J. Volkmann; Kelly, Holt & Christenson, PLLC

(57) ABSTRACT

To make a trusted web service call, a client application sends a series of messages to obtain tokens that allow service requests to pass through a service relay. The user obtains a first security token by providing the user's credentials. A second token is obtained from a trust broker that validates the first token. Both tokens are then sent with a service request to a service relay. The service relay validates the second token and then passes the first token and the service request to a connector service. The connector service vali-
(Continued)

dates the first token and passes the service request to a target back end service. The connector service acts as the user when communicating with the back end service. Service responses are routed back to the user through the connector service and the service relay.

12 Claims, 6 Drawing Sheets

Related U.S. Application Data continuation of application No. 13/893,029, filed on May 13, 2013, now Pat. No. 9,294,454.

(60) Provisional application No. 61/786,375, filed on Mar. 15, 2013.

(52) U.S. Cl.
CPC ...... *H04L 63/0815* (2013.01); *H04L 63/0884* (2013.01); *H04L 67/02* (2013.01); *H04L 67/28* (2013.01); *H04L 2463/082* (2013.01)

(56) References Cited

U.S. PATENT DOCUMENTS

| | | | | |
|---|---|---|---|---|
| 8,275,985 | B1* | 9/2012 | Narayanan | G06Q 50/14 713/150 |
| 8,316,443 | B2 | 11/2012 | Rits et al. | |
| 8,321,909 | B2 | 11/2012 | Fot et al. | |
| 2003/0112931 | A1* | 6/2003 | Brown | H04M 1/247 379/93.23 |
| 2005/0223217 | A1* | 10/2005 | Howard | G06F 21/31 713/155 |
| 2005/0273502 | A1* | 12/2005 | Patrick | G06Q 10/107 709/217 |
| 2006/0021018 | A1* | 1/2006 | Hinton | H04L 63/06 726/10 |
| 2006/0075475 | A1* | 4/2006 | Boulos | G06F 21/33 726/6 |
| 2006/0233180 | A1* | 10/2006 | Serghi | H04L 29/06 370/401 |
| 2008/0021997 | A1* | 1/2008 | Hinton | H04L 63/0815 709/225 |
| 2008/0134295 | A1* | 6/2008 | Bailey | G06F 21/41 726/4 |
| 2008/0289039 | A1* | 11/2008 | Rits | H04L 63/123 726/22 |
| 2009/0064107 | A1* | 3/2009 | Chan | H04L 63/0815 717/120 |
| 2009/0254978 | A1* | 10/2009 | Rouskov | G06F 21/335 726/4 |
| 2009/0320116 | A1* | 12/2009 | Guo | G06F 21/41 726/9 |
| 2010/0106965 | A1* | 4/2010 | Ross | H04L 9/3213 713/156 |
| 2010/0299366 | A1* | 11/2010 | Stienhans | G06F 9/5072 707/803 |
| 2011/0010542 | A1* | 1/2011 | Choi | H04L 9/3213 713/168 |
| 2011/0154435 | A1* | 6/2011 | Fot | H04L 63/102 726/1 |
| 2011/0179477 | A1* | 7/2011 | Starnes | G06F 21/52 726/9 |
| 2011/0208366 | A1* | 8/2011 | Taft | H04L 29/08846 700/295 |
| 2011/0307947 | A1* | 12/2011 | Kariv | H04L 63/08 726/9 |
| 2011/0307948 | A1* | 12/2011 | Ranjan | G06F 21/53 726/9 |
| 2011/0320366 | A1* | 12/2011 | Lalji | G06Q 10/06 705/301 |
| 2012/0096271 | A1* | 4/2012 | Ramarathinam | H04L 63/0807 713/172 |
| 2012/0144034 | A1* | 6/2012 | McCarty | H04L 63/0823 709/225 |
| 2012/0182573 | A1* | 7/2012 | Mok | G06F 3/1204 358/1.15 |
| 2012/0216268 | A1* | 8/2012 | Kassaei | H04L 9/3234 726/9 |
| 2012/0259748 | A1 | 10/2012 | Young et al. | |
| 2013/0191884 | A1* | 7/2013 | Leicher | H04L 63/08 726/4 |
| 2014/0090037 | A1* | 3/2014 | Singh | H04L 63/0815 726/7 |
| 2014/0280494 | A1* | 9/2014 | Samoylenko | H04L 67/10 709/203 |

FOREIGN PATENT DOCUMENTS

| | | |
|---|---|---|
| CN | 101534192 A | 9/2009 |
| CN | 101552784 A | 10/2009 |

OTHER PUBLICATIONS

"DirectControl's Integrated Support for Microsoft ADFS", Retrieved from https://web.archive.org/web/20130206025340/http://www.centrify.com/downloads/public/centrify_ds_adfs.pdf, Retrieved on: Mar. 15, 2013, 2 Pages.
Wrenn, George, "Secure SSO for Web Services", In Information Security, Jan. 2004, 2 Pages.
"Advisory Action Issued in U.S. Appl. No. 13/893,029", dated Jul. 30, 2015, 5 Pages.
"Amendment Filed in U.S. Appl. No. 13/893,029", filed Jan. 8, 2015, 11 Pages.
"Amendment with RCE Filed in U.S. Appl. No. 13/893,029", filed Aug. 26, 2015, 13 Pages.
"Applicant Initiated Summary Form Issued in U.S. Appl. No. 13/893,029", dated Jul. 30, 2015, 2 Pages.
"Drawings Filed in U.S. Appl. No. 13/893,029", filed May 13, 2013, 6 Pages.
"Final Amendment Filed in U.S. Appl. No. 13/893,029", filed Jun. 26, 2015, 11 Pages.
"Final Office Action Issued in U.S. Appl. No. 13/893,029", dated Mar. 26, 2015, 28 Pages.
"Issue Notification Issued in U.S. Appl. No. 13/893,029", dated Mar. 2, 2016, 1 Page.
"Non-Final Office Action Issued in U.S. Appl. No. 13/893,029", dated Oct. 7, 2014, 28 Pages.
"Notice of Allowance Issued in U.S. Appl. No. 13/893,029", dated Nov. 16, 2015, 15 Pages.
"Preliminary Amendments Filed in U.S. Appl. No. 13/893,029", filed Mar. 27, 2014, 5 Pages.
Salvatori, Paolo, "Managing and Testing Topics, Queues and Relay Services with the Service Bus Explorer Tool", Retrieved from http://web.archive.org/web/20131206063827/http://msdn.microsoft.com/en-us/library/windowsazure/hh532261.aspx, Dec. 6, 2013, 99 Pages.
"Applicant-Initiated Interview Summary Issued in U.S. Appl. No. 15/047,207", dated May 1, 2017, 3 Pages.
"Final Office Action Issued in U.S. Appl. No. 15/047,207", dated Mar. 10, 2017, 22 Pages.
"Non-Final Office Action Issued in U.S. Appl. No. 15/047,207", dated Oct. 6, 2016, 29 Pages.
"Notice of Allowance Issued in U.S. Appl. No. 15/047,207", dated Jul. 6, 2017, 11 Pages.
"First Office Action and Search Report Issued in Chinese Patent Application No. 201480015693.X", dated Oct. 24, 2017, 14 Pages.
Baier, et al., "A Guide to Claims-Based Identity and Access Control, Authentication and Authorization for Services and the Web", In Book: A Guide to Claims-Based Identity and Access Control: Authentication and Authorization for Services and the Web, Publication Microsoft Patterns & Practices, Dec. 31, 2011, 200 Pages.
"Dynamics AX", Retrieved from https://www.microsoft.com/en-us/store/apps/dynamics-ax/9wzdncrdtcd1, Mar. 21, 2012, 2 Pages.

(56) References Cited

OTHER PUBLICATIONS

"Dynamics AX", Retrieved from https://www.microsoft.com/en-us/store/apps/dynamics-ax-expired/9nblgggxx7w7, Feb. 26, 2013, 2 Pages.
"Introducing Communication Services", Retrieved from http://docs.oracle.com/cd/E14148_02/wlcp/ocsg41_otn/archoverview/tpoverview.html, Retrieved on: Mar. 15, 2013, 6 Pages.
"International Preliminary Report on Patentability Issued in PCT Application No. PCT/US2014/026926", dated Jun. 24, 2015, 11 Pages.
"International Search Report & Written Opinion Issued in PCT Application No. PCT/US2014/026926", dated Jun. 18, 2014, 12 Pages.
"Second Written Opinion Issued in PCT Application No. PCT/US2014/026926", dated Feb. 23, 2015, 10 Pages.
"Office Action Issued in European Patent Application No. 14717023.7," dated Mar. 13, 2018, 8 Pages.
"Second Office Action Issued in Chinese Patent Application No. 201480015693.X" dated Jun. 19, 2018, 9 Pages.
"Office Action Issued in European Patent Application No. 14717023.7", dated Oct. 22, 2018, 6 Pages.
"Third Office Action Issued in Chinese Patent Application No. 2014800693.X", dated Mar. 1, 2019, 7 Pages.
"Office Action Issued In European Patent Application No. 14717023.7", dated May 27, 2019, 6 Pages.

* cited by examiner

US 10,382,434 B2

ACTIVELY FEDERATED MOBILE AUTHENTICATION

CROSS-REFERENCE TO RELATED APPLICATIONS

The present application is a continuation of and claims priority of U.S. patent application Ser. No. 15/047,207, filed Feb. 18, 2016, which is a continuation of and claims priority of U.S. patent application Ser. No. 13/893,029, filed May 13, 2013, which is based on and claims the benefit of U.S. provisional patent application Ser. No. 61/786,375, filed Mar. 15, 2013, the contents of which are hereby incorporated by reference in their entirety.

BACKGROUND

Many businesses provide back office services, such as enterprise resource planning (ERP) and customer relationship management (CRM) applications, for employees. These applications typically use and store confidential and proprietary company information, such as financial data, contact information, and personnel files. Businesses limit access to these applications and the associated information to authorized users only.

When users are on-site, a business can authenticate users who access back office services via an enterprise network. However, when users are off-premises, it becomes more difficult to authenticate users and to provide services in a secure manner To maintain security, users who need to access back office services via a mobile client, such as a smartphone or tablet, must be authenticated as authorized before being allowed to perform actions exposed by the services.

For example, many companies use expense reporting systems to reimburse employees for expenses which they incur for business purposes and time reporting systems to capture employee hours. One of the challenges for employees is tracking the various expenses incurred for business purposes and hours worked on company business, particularly when expenses are incurred when the employee is away from his or her computer. In prior systems, employees needed to use some other process, such as saving paper receipts and logging hours worked, to keep track of expenses and time. Those expenses were then added to an expense report, and the time entries filed on a time card.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To make a trusted web service call, a client application sends a series of messages to obtain security tokens that allow service requests to pass through a service relay. The user obtains a first token by providing the user's credentials. A second token is obtained from a trust broker that validates the first token. Both tokens are then sent with a service request to a service relay. The service relay validates the second token and then passes the first token and the service request to a connector service. The connector service validates the first token and passes the service request to a target back end service. The connector service acts as the user when communicating with the back end service. Service responses are routed back to the user through the connector service and the service relay.

For example, in one embodiment, the present invention helps solve the problem of capturing expenses that are incurred and time worked when employees are traveling or otherwise away from their computer. A mobile phone application captures key expense information and associated receipts for expense reporting purposes. Employee time entries may also be captured. The expense (e.g., receipts) and time information are sent to a company's expense and time reporting systems through a mobile phone data connection. This helps the employee to easily capture the information while traveling or otherwise out of the office without needing to keep track of paper receipts, amounts paid in cash, or hours worked away from the office.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the invention allow a user's identity information that is coupled with a web service call to flow from a service client, such as a client software application, on a mobile device to a back office system over a service relay.

Figure 1:
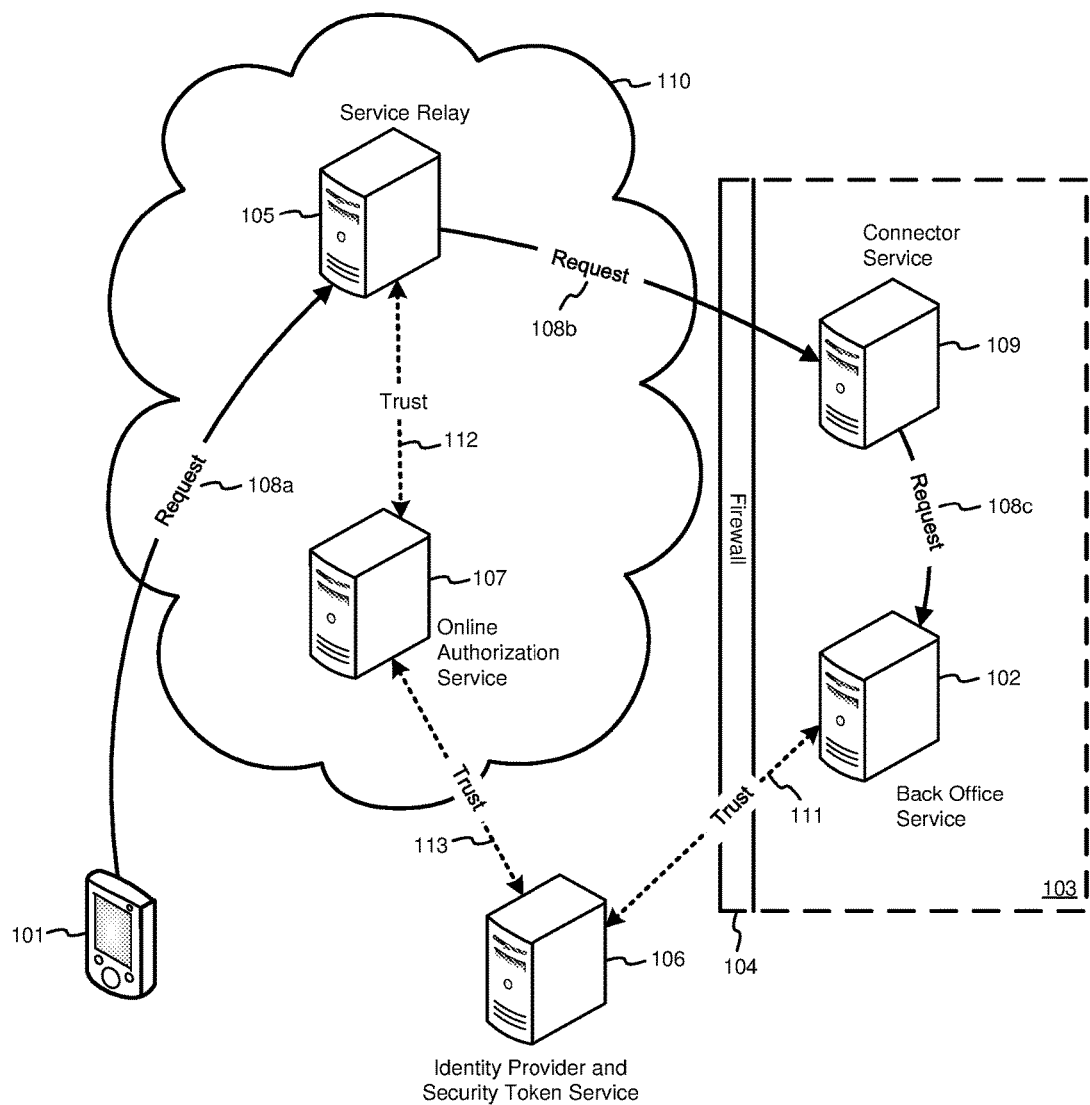
FIG. 1 illustrates components of a system that provides the ability for a mobile device to send and receive data to and from a back office service.

FIG. 1 illustrates components of a system that provides the ability for a mobile device 101, such as a smartphone or tablet, to send and receive data to and from a back office service 102, such as an ERP or CRM system. Back office service 102 may be part of an enterprise network 103 that is protected by a firewall 104. Instead of communicating with back office service 102 directly, mobile device 101 sends service requests through a globally available service relay 105. Using the service relay 105 avoids the need to provide a public endpoint on enterprise network 103 or back end service 102. Service relay 105 can communicate across firewall 104 and filters out unauthorized traffic that does not have the required security token.

An identity provider and security token service 106 is used to federate authentication and to provide credentials to authenticate the mobile device 101. Identity provider 106 and back office service 102 have a trust relationship 111. The trust relationship allows two entities to cryptographically verify that a particular message originated from either entity. The trust relationship uses symmetric or asymmetric keys to confirm to the receiving entity that the contents of the received message have not been tampered with. Identity provider 106 can provide a token to mobile device 101 with a claim that is used to authenticate service requests sent by mobile device 101 through a service relay 105. However, service relay 105 itself has no relationship with and does not know mobile device 101 or identity provider 106, so service relay 105 will not simply pass service requests and tokens from mobile device 101 without further authentication.

Service relay 105 has a trust relationship 112 with online authorization service 107. Service relay 105 and online authorization service 107 may be components of a cloud services environment 110, for example. Online authorization service 107 is adapted to issue tokens to authenticate mobile device 101 to service relay 105. If online authorization service 107 also has a trust relationship 113 with identity provider 106, then the token from identity provider 106 will authenticate mobile device 101 to both back office service 102 and online authentication service 107.

A service listening on service relay 105 receives a request 108a from mobile device 101 and verifies mobile device 101's identity using the token from online authorization service 107. To provide an additional layer of protection and flexibility for back office service 102, service relay 105 does not communicate with back office service 102 directly. Instead, the authenticated service request 108b is sent to a connector service 109 in enterprise network 103. Connector service 109 then forwards the request 108c to back office service 102.

Mobile device 101 may run a client application that is adapted as appropriate for the operating system and/or browser used by the device. In the examples illustrated herein, actions taken by mobile device 101 are performed by or under the control of the client application. The client application is configured to communicate with the identity provider 106 and online authorization service 107 to obtain the appropriate tokens from the security token services. The client application also communicates with the service relay 105 to exchange service requests/responses and the tokens. Mobile device 101 may be any mobile device, such as a smartphone or tablet running a Microsoft Windows®, iOS, or Android operating system. The client application does not have to be on a mobile device. In other embodiments, the client application may be a Microsoft .NET software application, a service, a website, or any fixed or mobile point inside or outside the enterprise network 103 that can make a service request to back office service 102.

Figure 2:
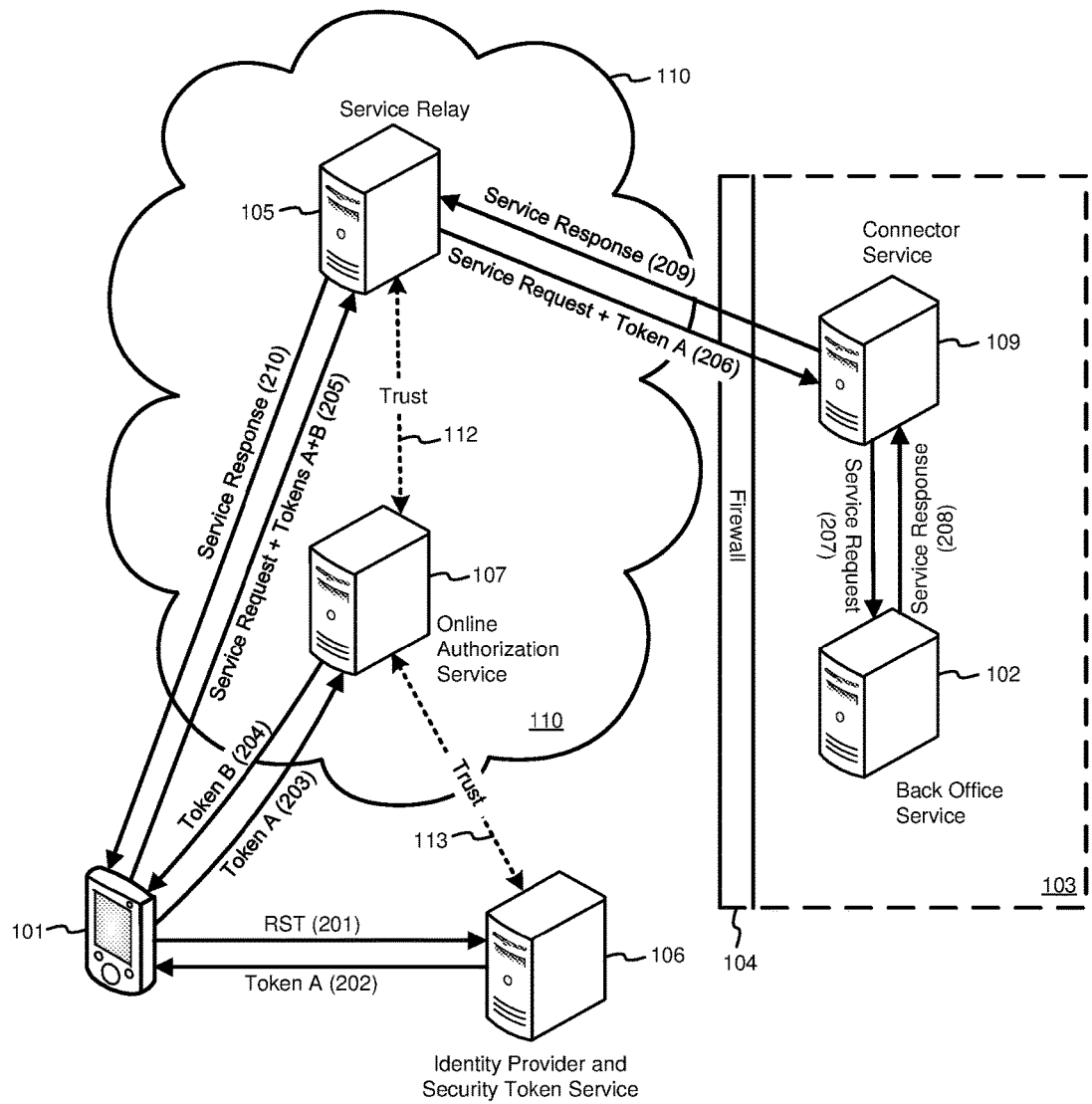
FIG. 2 illustrates the flow of messages in the system to allow mobile device to communicate with back office service in one embodiment.

FIG. 2 illustrates the flow of messages in the system to allow mobile device 101 to communicate with back office service 102 in one embodiment. Mobile device 101 first sends request for security token (RST) message 201 to identity provider 106. The request 201 includes the user's credentials, such as a user name and password. Mobile device 101 and identity provider 106 may use a web service security protocol such as WS-Trust. The user's credentials, which are included in message 201, are used by identity provider 106 to authenticate the user with back office service 102. Identity provider 106 replies in message 202 with Token A, which may be a security assertion markup language (SAML) token, for example.

Token A will authenticate the mobile device 101 to back office service 102; however, mobile device 101 must also be authenticated to service relay 105. Mobile device 101 sends the SAML Token A in request 203 to online authorization service 107, which operates as a trust broker. Because online authorization service 107 and identify provider 106 have a trust relationship 113, online authorization service 107 can verify, validate, and accept Token A and return a new Token B in reply 204. Token B may be a simple web token (SWT), for example.

Mobile device 101 then sends a service request 205 and tokens A and B to service relay 105. The service request may be any operation supported by back office service 102. Token B provides service relay 105 with permission to allow the relay to occur. Service relay 105 then sends the service request 206 and Token A to connector service 109, which validates and approves the user with Token A. Connector service 109 then sends the service request 207 to back office service 102 for processing. Connector service may act as a translation service that validates the service request, identifies the user, and then acts as the user (i.e., impersonates the user) vis-à-vis the back end service 102. In this way, back end service 102 does not have to be concerned with authentication and does not need to know the client or the actual origin or source of a service request, and can process requests from a variety of different client platforms or implementations. As a corollary, the client does not need to know the back end service 102 or the actual destination of a service request. In this way, back office service 102 may actually be several different and possibly unrelated enterprise systems in other embodiments.

Back office service 102 sends a service response 208 to connector service 109, which forwards the response 209 to service relay 105. Mobile device 101 then receives the service response 210 from the service relay.

The client application on mobile device 101 is adapted to generate service requests appropriate to the back office service 102. It will be understood that the back office service 102 may include any enterprise resource planning, customer relationship management, or other enterprise or back end service, including, for example, but not limited to, time capture, expense capture, project management, resource management, or approvals application, or other back-end system that exposes web services, which may be either SOAP or RESTful services, for example. In another embodiment, back office service 102 may be a collection of different systems having any such services. A group of systems may cooperatively provide a selected service to users through connector service 109. Alternatively, a plurality of systems may provide different services to users through connector service 109.

For example, cloud service environment 110 may be a Microsoft Windows Azure™ service wherein a Windows Azure™ Service Bus acts as service relay 105, and a Windows Azure™ Access Control Service acts as online authorization service 107. In other embodiments, cloud service environment 110 may be, for example, Amazon Web Services or any other distributed computing service having a service relay and any security token service that is compatible with the service relay and establishing trust with an identity provider. Although the online authorization service 107 is described as issuing a SWT token over the WRAP protocol, it will be understood that the online authorization service could issue any security token using any security protocol.

In an example embodiment, the identity provider 106 may be Microsoft's Active Directory with Active Directory Federation Services or any other identity provider and security token service. Although the identify provider 106 is described above as issuing a SAML token over the WS-Security & WS-Trust protocol, it will be understood that the identity provider could issue any security token over any security protocol.

The service relay 105 hosts a middle tier service endpoint, which may be any relay service capable of hosting a web service endpoint and handling the token from the identity provider. In one embodiment, the web services utilize the HTTP protocol over SSL, although it will be understood that the service messages can use any transport protocol and associated transport-level security, such as Net.TCP.

In a SOAP-based service, the security tokens may be placed in the SOAP header or the HTTP header. In a REST-based service, a security token for authorizing with the service relay may be placed in the HTTP header as required and understood by service relay 105, and the other token may be placed in the message body or the HTTP header.

Although connector service 109 is illustrated as using Token A to validate the service request from mobile device 101, it will be understood that any token, including Token B from the online authorization service 107, may be used to validate the service request. Accordingly, in another embodiment (illustrated in FIG. 3), if connector service 109 had a trust relationship 300 to online authorization service 107, then Token B alone (i.e., without Token A) could be passed in message 206 along with the service request. In this scenario, connector service 109 would use the claim in Token B to validate the service request.

Figure 3:
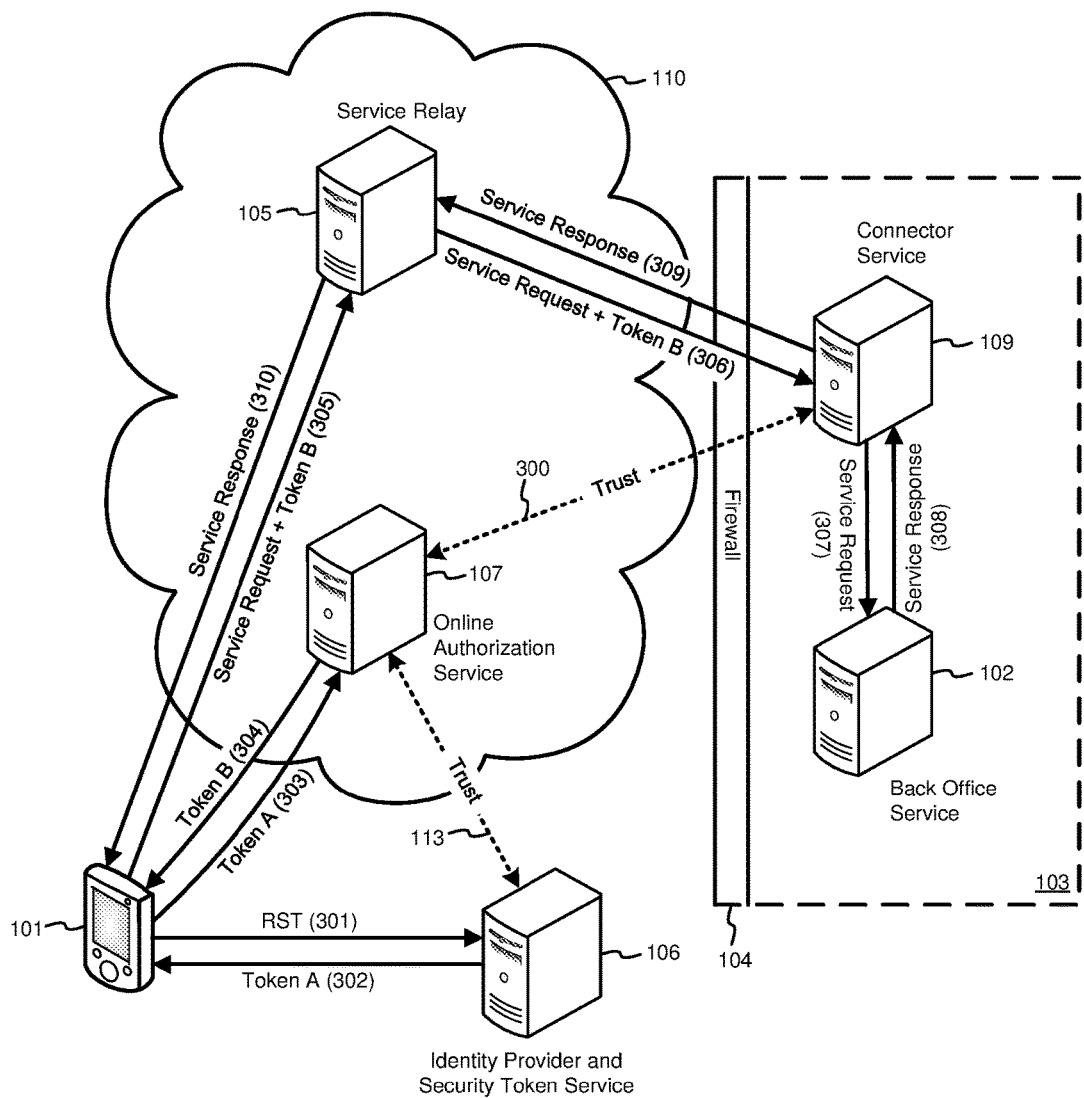
FIG. 3 illustrates an example system in which a token from an online authorization service may be used to validate a service request.

FIG. 3 illustrates an example system in which a token from an online authorization service 107, such as a Windows Azure™ Access Control Service, may be used to validate a service request. Trust relationship 300 is established between connector service 109 and online authorization service 107. When mobile device 101 needs to communicate with back office service 102, it sends request for security token message 301 to identity provider 106, which may include, for example, a user name and password or other credentials for mobile device 101. Identity provider 106 replies in message 302 with Token A, such as a SAML token.

Mobile device 101 then sends the SAML Token A to online authorization service 107 in request 303. Because online authorization service 107 and identify provider 106 have a trust relationship, online authorization service 107 can verify, validate, and accept Token A and return a new Token B in reply 304, which may be a SWT token, for example. Token A is no longer needed because Token B can now be used to authenticate the mobile device 101 to back office service 102. Additionally, Token B can be used to authenticate the mobile device 101 to service relay 105.

Mobile device 101 sends a service request and Token B to service relay 105 in message 305. The service request may be any operation supported by back office service 102. Token B provides service relay 105 with permission to allow the relay to occur. Service relay 105 then sends the service request and Token B to connector service 109 in message 306. Connector service 109 validates and approves the user with Token B. Connector service 109 then sends the service request 307 to back office service 102 for processing.

Back office service 102 sends a service response 308 to connector service 109, which forwards the response 309 to service relay 105. Mobile device 101 then receives the service response 310 from the service relay.

Figure 4:
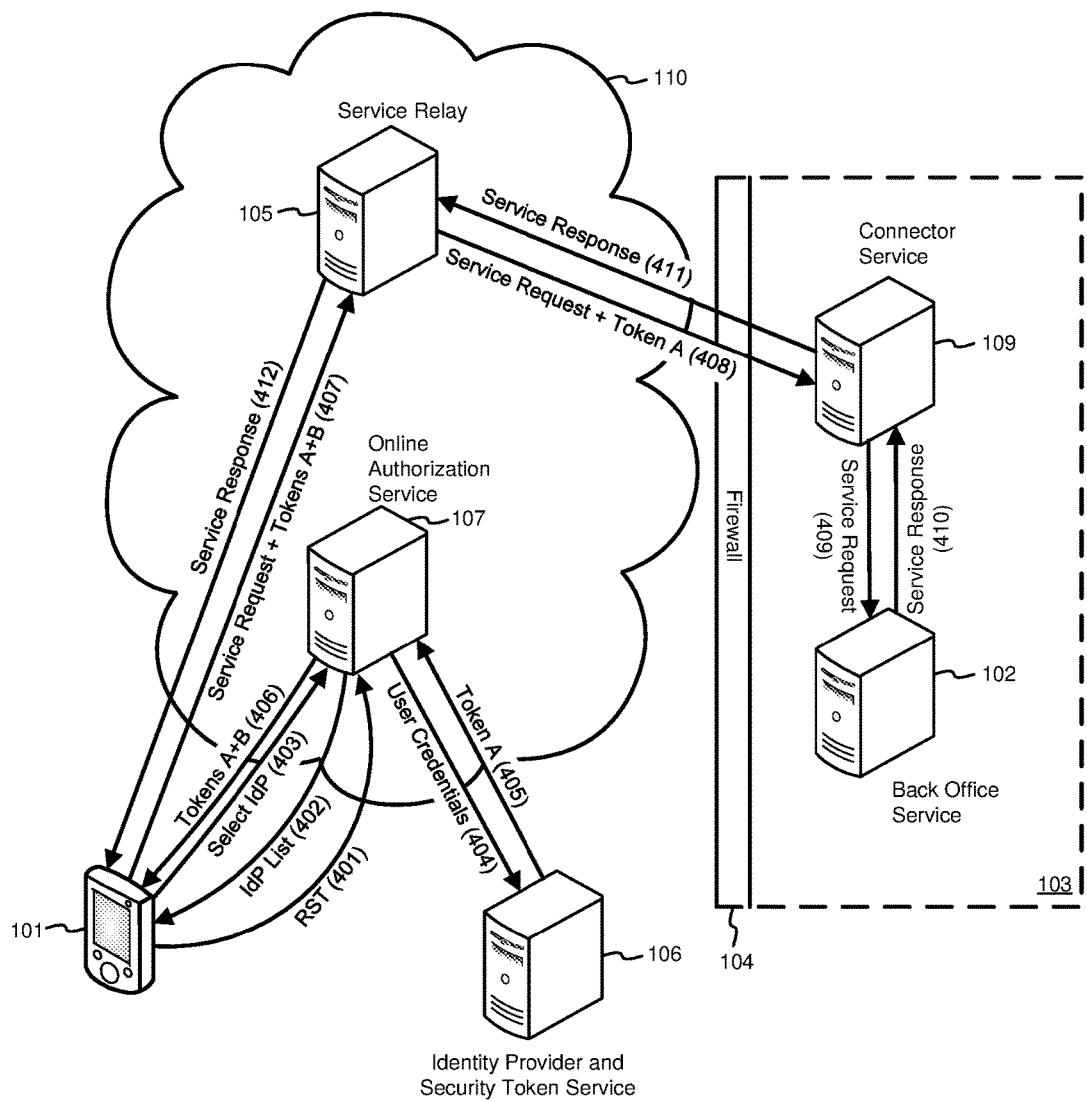
FIG. 4 illustrates an alternative message flow that does not require the mobile device to directly contact the identity provider.

In one embodiment, the invention combines existing technologies into an authentication solution using an active federation pattern. In other embodiments, passive federation may be used. FIG. 4 illustrates an alternative message flow that does not require the mobile device to directly contact the identity provider 106. Instead, the first message 401 requesting a security token goes from mobile device 101 to online authorization service 107. In response, online authorization service 107 sends in message 402 a list of identity providers (IdP) for which service 107 has a trust relationship. Mobile device 101 selects one or more of the identity providers 403 that it recognizes and that will accept mobile device 101's credentials, such as identity provider 106. The identity provider may be any WS-Trust, OpenID, or other identity provider, for example. Mobile device 101 instructs online authentication service 107 regarding which identity provider (e.g., security token service 106) to use in message 403. Mobile device 101 may provide user credentials in message 401 or message 403 or in another message.

In other embodiments, online authorization service 107 may send a redirect message to mobile client 101 to a web page hosted on identity provider 106 so that the client can securely enter their credentials without mobile client 101 or online authorization service 107 seeing the credentials.

Online authorization service 107 sends the user credentials to identity provider 106 in message 404 and requests a SAML or other token for validation with back office service 102. Identity provider 106 validates the user credentials and then sends SAML Token A in message 405. The online authentication server 107 validates token A and then generates a SWT Token B that is sent to the mobile device 101 in message 406 along with Token A. In other embodiments, only Token B is sent in message 406 and used for further authentication.

Mobile device 101 then sends a service request and tokens A and B in message 407 to service relay 105. The service request may be any operation supported by back office service 102. Token B provides service relay 105 with permission to allow the relay to occur. Service relay 105 then sends the service request and Token A in message 408 to connector service 109, which validates the user with Token A. Connector service 109 then sends the service request in message 409 to back office service 102 for processing. Back office service 102 sends a service response 410 to connector service 109, which forwards the response 411 to service relay 105. Mobile device 101 then receives the service response 412 from the service relay.

Figure 5:
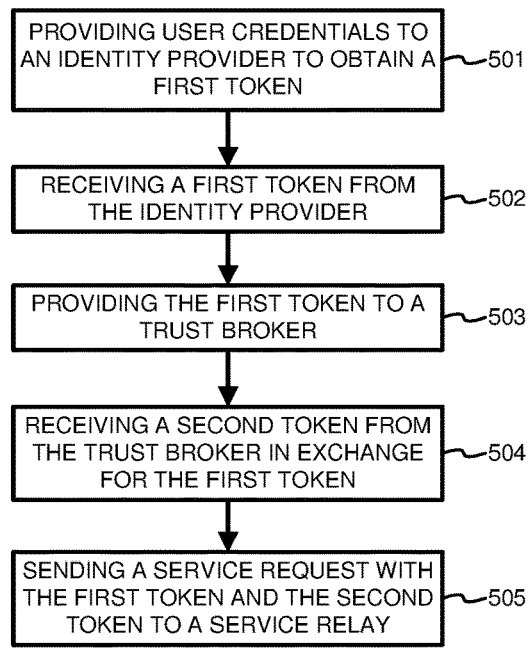
FIG. 5 is a flowchart illustrating a method or process for obtaining credentials by a mobile device to make web service calls access an enterprise service via a service relay.

FIG. 5 is a flowchart illustrating a method or process for a mobile device to obtain identity tokens in order to make trusted web service calls to access an enterprise service or back office service via a service relay. In step 501, the mobile device provides user credentials to an identity provider to obtain a first token. The identity provider has an established trust relationship with the enterprise service. The token provides authentication for service requests received at the enterprise service. In step 502, the mobile device receives the first token from the identity provider. The first token contains information (i.e., claims) about the user's identity (e.g., his or her username) to uniquely identify the user. In step 503, the mobile device 101 provides the first token to a trust broker. The trust broker has an established trust relationship with a service relay and the identity provider.

In step 504, the mobile device receives a second token from the trust broker in exchange for the first token. The second token provides authentication for the service relay. In step 505, the mobile device sends a service request to the service relay with the first token and the second token.

The enterprise service may be a back office service that processes the service requests or a connector service that validates the service requests and passes the service requests to the back office service. The first token contains a representation of the user's identity in a claim (e.g., the username or other unique identifier) that allow the connector service to make web service calls to the back office service as if the connector service was the user. The first token may be a SAML token, and the second token may be a SWT token.

Figure 6:
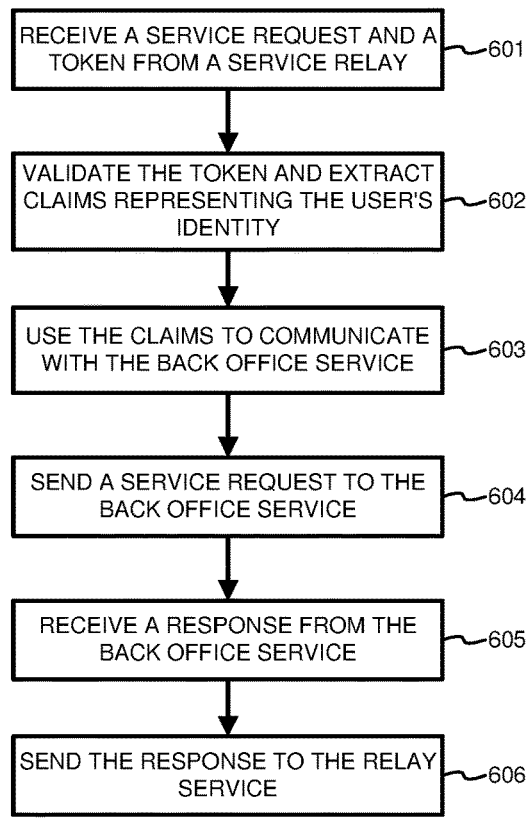
FIG. 6 is a flowchart illustrating a method for processing service requests at a connector service in an enterprise network.

FIG. 6 is a flowchart illustrating a method for processing service requests at a connector service in an enterprise network. In step 601, the connector service receives a service request and a token from a service relay. The service request is directed to a back office service in the enterprise network. The token comprises user credentials corresponding to a user who sent the service request. In step 602, the connector service validates the token and extracts claims representing the user's identity.

In step 603, the connector service uses the claims to communicate with the back office service in the user's place. In step 604, the connector service sends the service request to the back office service. In step 605, the connector service receives a response to the service request. The connector service sends the response to the service relay in step 606.

It will be understood that steps 501-504 of the process illustrated in FIG. 5 and steps 601-606 of the process illustrated in FIG. 6 may be executed simultaneously and/or sequentially. It will be further understood that each step may be performed in any order and may be performed once or repetitiously.

Figure 7:
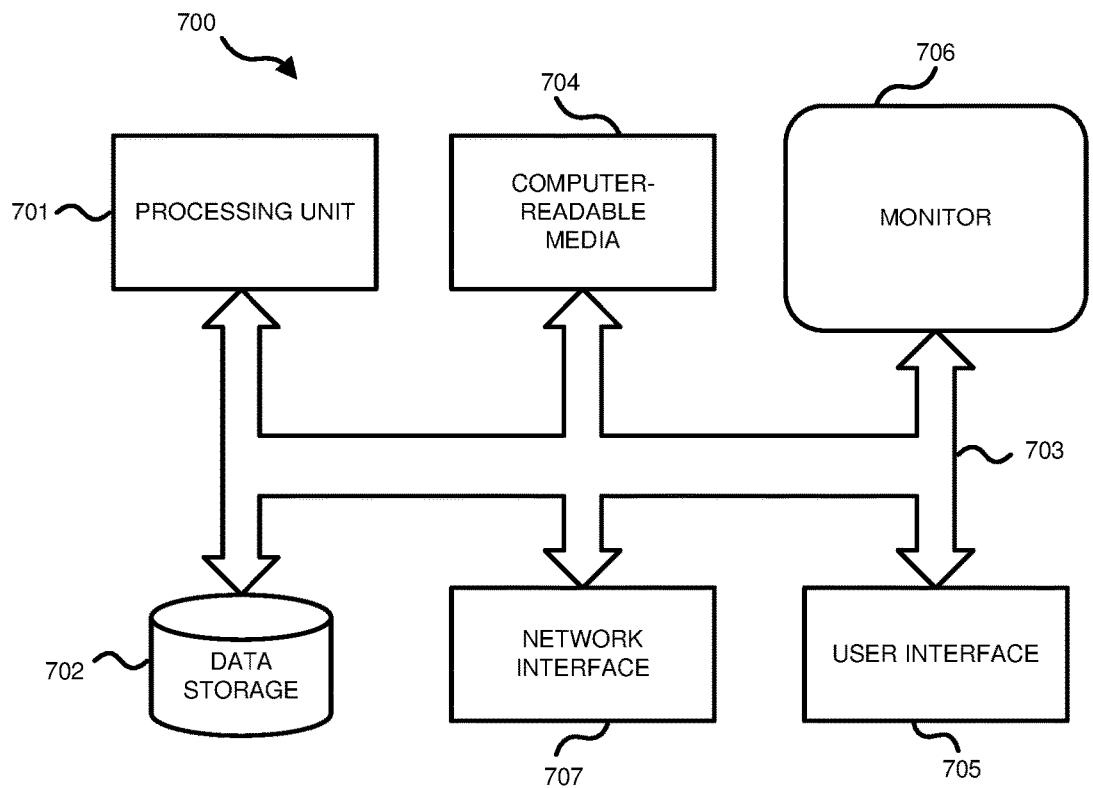
FIG. 7 illustrates an example of a computing and networking environment on which embodiments of the invention may be implemented.

FIG. 7 illustrates an example of a suitable computing and networking environment 700 on which the examples of FIGS. 1-6 may be implemented. The computing system environment 700 is only one example of a suitable computing environment for mobile device 101 or for a server or computer that can run services 102, 105, 106, 107 or 109. FIG. 7 is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, or an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a client computing device, the method comprising:
sending a user credential over a computer network to an identity provider having an established trust relationship with a hosted service that is hosted by a computing system that is remote from the client computing device, the user credential being associated with a user of the client computing device;
receiving, from the identity provider over the computer network, a first token including authentication information configured to authenticate a service request with, the hosted service;
sending the, first token to a trust broker that has an established trust relationship with the identity provider;
receiving, from the trust broker in response to the first token, a second token including a form of authentication information that is different than the first token and is configured to authenticate a service relay to send the service request to the hosted service;
sending, to the service relay, the service request with the second token; and
receiving, from the service relay, a service response indicative of authentication of the client computing device by the hosted service based on the second token.

2. The method of claim 1, wherein the hosted service comprises a firewall-protected network that is protected by a firewall, and the service relay is configured to communicate across the firewall.

3. The method of claim 1, wherein the hosted service comprises an enterprise service.

4. The method of claim 1, wherein the client computing device comprises a mobile device.

5. A client computing device comprising:
a processor; and
memory storing instructions executable by the processor, wherein the instructions, when executed, configure the client computing device to:
send a user credential over a computer network to an identity provider having an established trust relationship with a hosted service, that is hosted by a system that is remote from the client computing, device;
receive, from the identity provider, a first token including authentication information configured to authenticate a service request with the hosted, service;
send, to a service relay, the service request with the first token; and
receive, from the service relay, a service response indicative of authentication of the client computing device by the hosted service based on the first token.

6. The client computing device, of claim 5, wherein the hosted service comprises a firewall-protected network that is protected by a firewall, and the service relay is configured to communicate across the firewall.

7. The client computing device of claim 5, wherein the hosted service comprises an enterprise service.

8. The client computing device of claim 7, wherein the enterprise service comprises at least one of:
   a back office service configured to, process the service request: or
   a connector service configured to expose a web service endpoint for a back office service.

9. The client computing device of claim 5, wherein the instructions, when executed, configure the client computing device to:
   send the first token to a trust broker that has an established trust relationship with the identity provider;
   receive, from the trust broker in response to the first token, a second token including an additional form of authentication information that is different than the first token and is configured to authenticate a service relay to send the service request and the first token to the hosted service; and
   send, to the service relay, the service request with both the first token and the second token.

10. The client computing device of claim 5, wherein the client computing device comprises a mobile device.

11. The Client computing device of claim 5, wherein the hosted service comprises a connector service configured to extract user identity information from the first token.

12. The client computing device of claim 5, wherein the hosted service comprises a group of different systems configured to provide one or more services.

* * * * *